US009218342B2

(12) United States Patent
Liu et al.

(10) Patent No.: US 9,218,342 B2
(45) Date of Patent: Dec. 22, 2015

(54) CONVERSION OF A DOCUMENT WHILE RETAINING A FORMAT OF AN ELEMENT OF THE DOCUMENT

(75) Inventors: Ming Liu, Redmond, WA (US); Raman Narayanan, Seattle, WA (US); Radoslav Petrov Nickolov, Bellevue, WA (US); Rajendra Vishnumurthy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 12/943,998

(22) Filed: Nov. 11, 2010

(65) Prior Publication Data

US 2012/0124465 A1    May 17, 2012

(51) Int. Cl.
*G06F 17/24*    (2006.01)
*G06F 17/30*    (2006.01)
*G06F 17/25*    (2006.01)

(52) U.S. Cl.
CPC ..................................... *G06F 17/30* (2013.01)

(58) Field of Classification Search
CPC ..................................................... G06F 17/227
USPC ......................................................... 715/239
See application file for complete search history.

(56) References Cited

U.S. PATENT DOCUMENTS

| 5,619,717 | A  | * | 4/1997  | Staats ............................ 712/36 |
| 7,148,907 | B2 |   | 12/2006 | Smith et al. |
| 7,898,549 | B1 | * | 3/2011  | Cunniff et al. ................ 345/553 |
| 2003/0236787 | A1 | * | 12/2003 | Burges ............................ 707/10 |
| 2004/0075699 | A1 | * | 4/2004  | Franchi et al. ................ 345/860 |
| 2007/0253027 | A1 | * | 11/2007 | Hiebert ........................ 358/1.18 |
| 2008/0139191 | A1 | * | 6/2008  | Melnyk et al. ................ 455/419 |
| 2008/0309673 | A1 | * | 12/2008 | Kudo ............................ 345/533 |
| 2009/0063525 | A1 | * | 3/2009  | Vangati et al. ................ 707/101 |
| 2009/0195553 | A1 |   | 8/2009  | Mathew et al. |
| 2009/0284535 | A1 |   | 11/2009 | Pelton et al. |
| 2010/0049684 | A1 | * | 2/2010  | Adriaansen et al. ............ 706/46 |
| 2010/0083094 | A1 | * | 4/2010  | Kerr .............................. 715/234 |
| 2010/0194753 | A1 | * | 8/2010  | Robotham et al. ............ 345/428 |
| 2012/0047203 | A1 | * | 2/2012  | Brown et al. .................. 709/203 |

OTHER PUBLICATIONS

Cao; et al., "3D Vector-Raster Data Integration Model Based on View Dependent Quadtree and GPU Friendly Rendering Algorithm"—Published Date: 2009 http://ieeexplore.ieee.org/xpls/abs_all.jsp?arnumber=5193942.

Chung; et al., "Blocked-Z Test for Reducing Rasterization, Z Test and Shading Workloads"—Published Date: Oct. 9, 2009, http://ieeexplore.ieee.org/xpl/freeabs_all.jsp?arnumber=5284057.

(Continued)

*Primary Examiner* — James J Debrow
(74) *Attorney, Agent, or Firm* — Steve Wight; Judy Yee; Micky Minhas

(57) ABSTRACT

One or more techniques and/or systems are disclosed for high fidelity conversion of a document to a less rich format. A bounding area can be identified in the document that comprises an unsupported element, and/or a blending of elements that is not supported in the less rich format. The bounding area that comprises the unsupported element(s) can be rasterized, by creating an image and identifying raster data for the image. Those elements in the document that are outside the bounding area are not rasterized, and their vector data-based format is retained in the converted document.

20 Claims, 8 Drawing Sheets

(56) References Cited

OTHER PUBLICATIONS

Dachsbacher; et al., "3D Rasterization—Unifying Rasterization and Ray Casting"—Published Date: Aug. 20, 2009, http://www.vis.uni-stuttgart.de/~engelhts/paper/3dr_techreport.pdf.

"An introduction to making maps on a computer"—Retrieved Date: Aug. 18, 2010 http://www.mapmaker.org/tools/computerized%20mapping.pdf.

"Transparency for Print Output in Adobe Creative Suite 3"—Retrieved Date: Aug. 18, 2010 http://www.adobe.com/designcenter/creativesuite/articles/cs3ip_transp_21.html.

\* cited by examiner

CONVERSION OF A DOCUMENT WHILE RETAINING A FORMAT OF AN ELEMENT OF THE DOCUMENT

BACKGROUND

In a computing environment, documents such as those produced and/or rendered by word processors, browsers, and other document creation application can comprise vector data, and/or raster data. Vector data can comprise code-based descriptions of graphical elements of the document, text-based elements of the document, and/or or images in the document. For example, the vector data may describe the letter of a word, the font used, the size of the character, and the color of the character. Raster data can comprise descriptions of the respective pixels that make up one or more elements in an image of the document. For example, raster data may indicate a value for color channels for the pixel, such as the red, green and blue (RGB) color channels. Some types of vector data may not be supported for rendering in some types of applications configured to display the document; therefore, some vector data is rasterized for display in applications that don't support the vector data.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Vector-based elements in a document are described by vector data, and may not be affected by a zoom level or display resolution for a final visual display of the document. For example, because the vector data describes the element, when a user zooms into a graphical element in the document, the vector-based element can retain a same fidelity. However, rasterized elements in a document are described by raster data, and they can be affected by zooming and/or display resolution. For example, because the raster data describes a color for a pixel, when zooming into the element it can lose resolution and become very granulated (e.g., pixilated) because the display only knows what the color at that pixel is supposed to be.

Because some applications cannot support all types of vector data (e.g., some vector data is proprietary and/or unknown to some applications), in order to view the document that comprises unsupported vector data it needs to be converted. Typically, converting a vector-based document to a less rich format (e.g., less vector data) comprises rasterizing the entire document. Rasterizing the entire document is relatively easy, and straight-forward, but the size of the document may be increased, fidelity may be lost in the converted document, and a user may be limited in uses for the document.

Accordingly, one or more techniques and/or systems are disclosed that provide for rasterizing merely a portion of the document for conversion, for example, where the rasterized portions comprise unknown and/or unsupported vector data. For a portion of the document where vector data is unsupported, a raster image can be created and combined with the portion of the document that is non-rasterized. Further, where elements are blended, such as supported elements blended with unsupported elements, merely the portion of the document comprising this type of blending can be rasterized and combined with unrasterized elements. In this way, for example, the converted document can retain a higher amount of vector data, while mitigating an amount of raster data, thereby producing a higher fidelity, yet relatively compact, document than previous techniques.

In one embodiment for high fidelity conversion of a document to a less rich format, one or more bounding areas are identified in the document, where the one or more bounding areas respectively comprise a blending of elements that is not supported in the less rich format, such as a blending of unsupported elements and supported elements. Further, the elements in the respective one or more bounding areas are rasterized (e.g., converted to raster data), and a format of a non-rasterized element in the document, those that are outside the one or more bounding areas, is retained, such as in the converted document.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
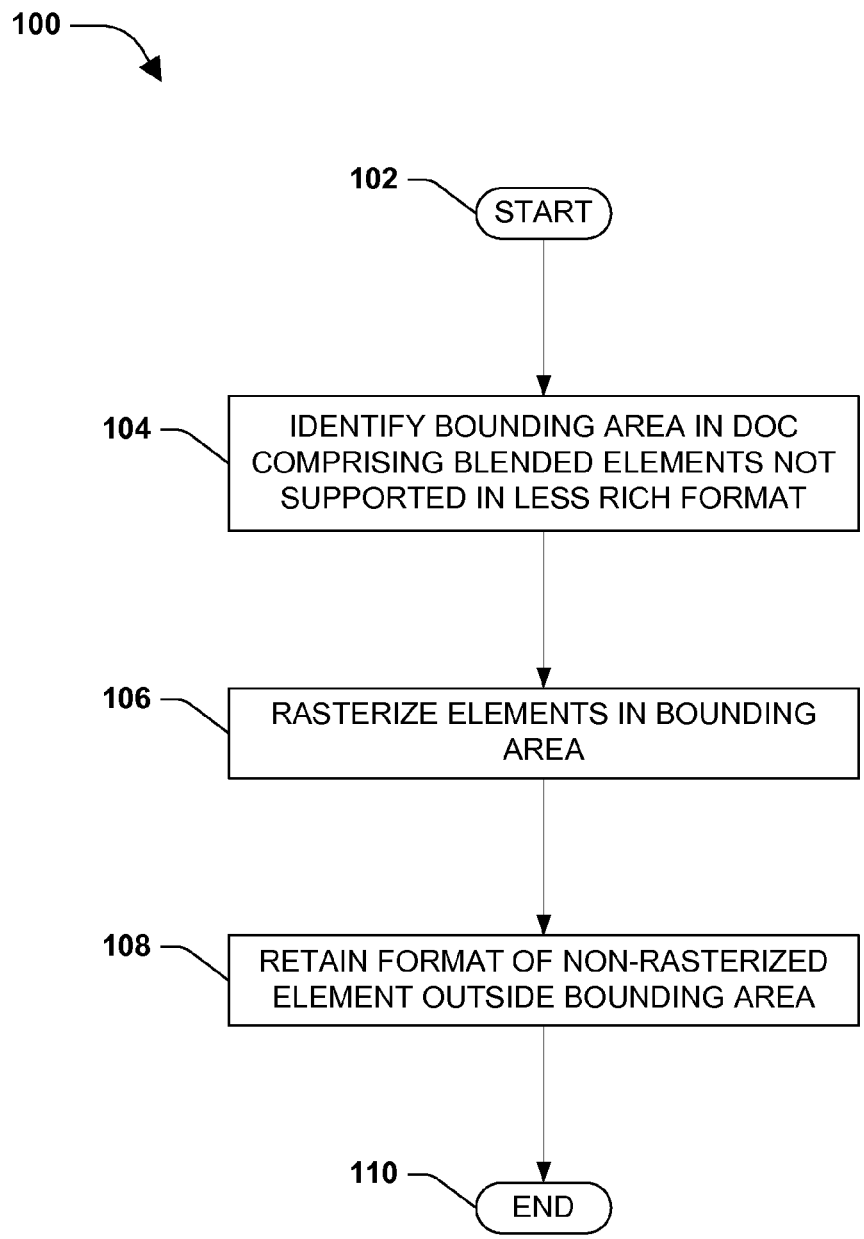
FIG. 1 is a flow diagram of an exemplary method for high fidelity conversion of a document to a less rich format.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for efficient use of vector data retained in a document (e.g., maximizing the vector data retained) when converting the document from a rich format to a less rich format. Documents that are displayed in applications, such as browsers and word processors, can comprise a mix of raster data and vector data. When converting these document from a rich format (e.g., supports more vector types) to a less rich format (e.g., supports less vector types) vector data is commonly rasterized. Rasterizing vector data can result in a loss of fidelity for high-frequency data (e.g., data comprising a high contrast between edges and/or colors, such as text, paths, etc.). Using the techniques described herein, a higher fidelity document may be provided by retaining more vector data in the converted document.

FIG. 1 is a flow diagram of an exemplary method 100 for high fidelity conversion of a document to a less rich format. The exemplary method 100 begins at 102 and involves identifying one or more bounding areas in the document, where the one or more bounding areas respectively comprise a blending of elements that is not supported in the less rich format, at 104. For example, in vector-based documents, document elements, such as images, text, graphics, etc., can be blended together and the blending of the elements can be supported in a rich, vector-based document format. However, an application that is rendering the document may not support the blended vector-based elements, for example, and the document is converted to a less rich format so that the rendering application can display the document.

At 106, the elements in the respective one or more bounding areas are rasterized. Raster data can describe pixels in a raster image, for example, where the raster image comprises color data (e.g., color values for red, green and blue (RGB) color channels) for respective pixels. In one embodiment, rasterizing contents of the bounding area can comprise converting the contents to a raster image, comprising raster data for the respective pixels in the bounding area. For example, an image can be created from the vector data, and the image can be converted to raster data, such as by identifying the color channel information for the pixels.

At 108 in the exemplary method 100, an image format of one or more non-rasterized elements that are outside the one or more bounding areas of the document is retained. That is, for example, those elements outside the identified bounding area(s) of the document may be described by vector data. In this example, during the conversion, the vector data is retained in the converted document for these non-rasterized elements. In this way, in this embodiment, merely those blended elements having vector data that is not supported in the rendering application are rasterized, while elements whose vector data is supported in the rendering application (e.g., unblended elements) retain their vector data in the converted document. By selectively rasterizing merely unsupported elements, thereby maintaining more vector data, for example, the converted document can comprise a higher fidelity than one that is completely rasterized.

Having rasterized the bounding area(s) and retained the format of the non-rasterized element(s), the exemplary method 100 ends at 110.

Figure 2:
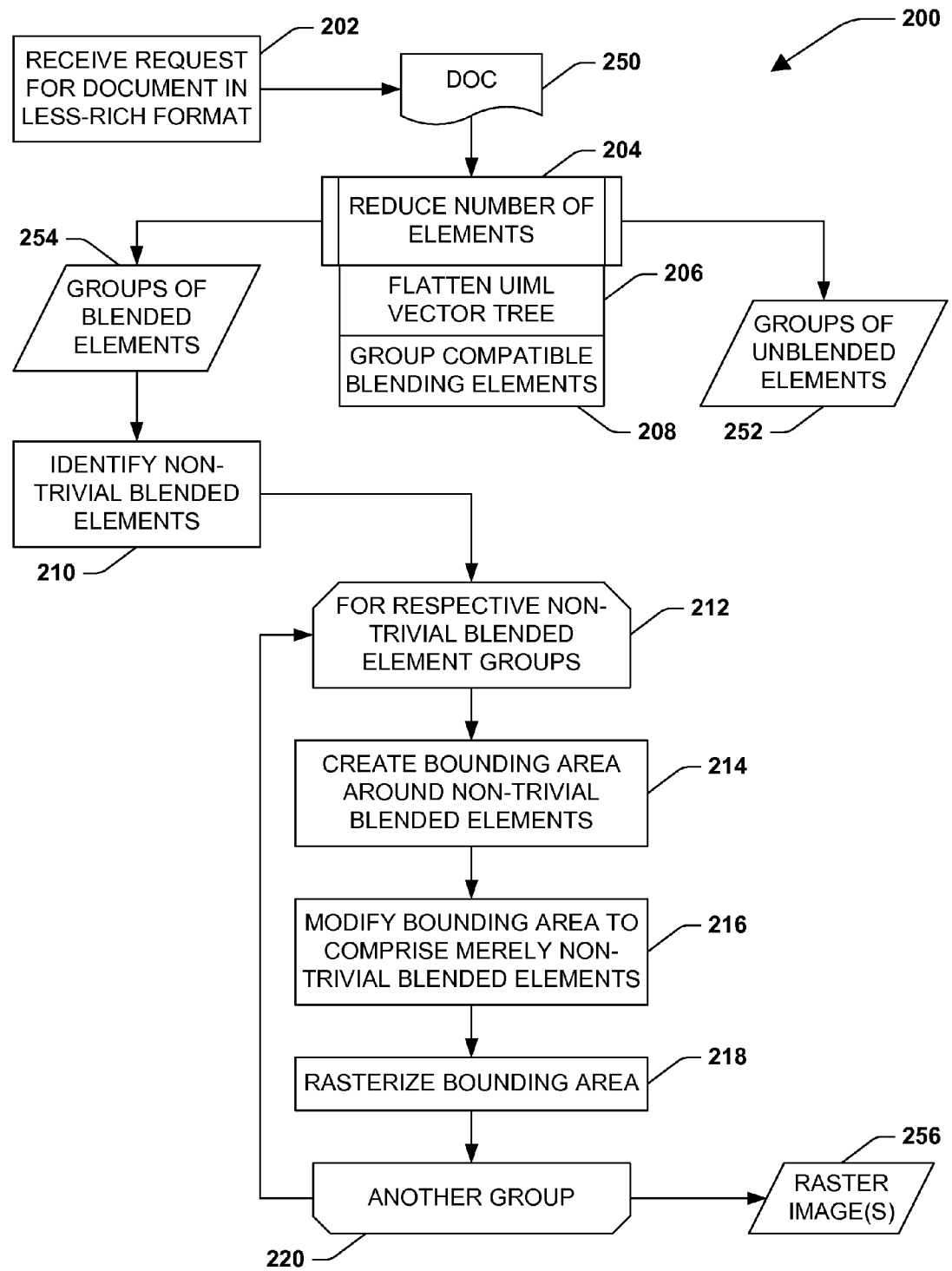
FIG. 2 is a flow diagram illustrating an example embodiment of one or more portion of a method where one or more techniques described herein may be implemented.

FIG. 2 is a flow diagram illustrating an example embodiment 200 of one or more portion of a method where one or more techniques described herein may be implemented. At 202, a request is received for a document 250 in a less-rich format. For example, a browser may request a document that comprises vector-based elements (e.g., vector graphics, text, etc.) which may be mixed with raster-based elements (e.g., raster images). However, in this example, the browser does not support all of the vector-based elements, a blending of elements, and/or a mixture of the vector and raster elements; or even just a portion of the document which may comprise unknown vector data.

As another illustrative example, a source application may create documents in a rich format that comprises vector data, where vector data describes the elements (e.g., instead of describing the pixels as in raster data). In this example, the requesting application may not know how to render certain vector data, and/or blended elements. Often, applications may utilize vector data that is proprietary and/or merely supported by a few applications. Further, for example, a user may wish to view the document that comprises the vector data from the source application, but the requesting application does not have support for understanding the vector data from the source application.

At 204 in the example embodiment 200, a number of elements comprised in the document is reduced. For example, reducing a number of elements in the document can reduce a number of elements that are checked to determine if rasterization is to be utilized, and/or can reduce a number of elements for rasterization. Reducing the number of elements can comprise flattening a user interface markup language (UIML) vector tree at 206 for the document to comprise separate rendering UIML elements for respective clipping canvas children.

For example, documents that comprise vector-data can utilize a UIML, which is a markup language, such as extensible markup language (XML), used for rendering and describing graphics and controls. UMILs are typically read by a sub-application at runtime to be interpreted as program code for processing and rendering in a desired form for the document, particularly when processed by a browser application, for example. As another example, a UMIL may also be described as a graphics markup language, where the markup language describes the graphical elements of the document.

In one embodiment, the UMIL for the document can be organized in a tree, where respective nodes have at least one parent and zero or more children. Further, leaves of the tree (e.g., terminal nodes) can comprise visible elements of the document, and their parents can comprise container elements. In this embodiment, the UMIL tree can be flattened so that the parent node(s) for a leaf are collapsed down to the leaf, for example, such that merely the respective leaves of the tree remain. In one embodiment, the flattening can comprise creating a representation of the vector tree that merely comprises leaf graphical elements associated with parent container element(s).

Further, at 208, the reducing of the elements can comprise grouping compatible blending elements. In one embodiment, the grouping can comprise grouping UIML elements that exhibit compatible blending with each other into a group, from the separate rendering UIML elements. Compatible blended elements can comprise "normal" blended elements, for example, where respective "normal" blended elements can share a same transform, and/or clipping region, for example.

In this example, those "normal" blended elements can be grouped into a same container. As an illustrative example, the container may deal with a visual component of a graphical element, such as color, font, size, format, etc. In this example, a transform can comprise an application of a graphics operation (e.g., change position, clipping part of text or graphic, etc.) to a basic element that "transforms" them into another form.

Further, in one embodiment, when flattening the tree and grouping elements, text-based UIML elements may not be grouped together. For example, text fidelity can be important for the document, particularly if the user wishes to zoom in to text. In this example, if text is rasterized (e.g., when two text elements are grouped into one visual element container) merely the pixels are described for the text; therefore, when zooming in the text may exhibit pixilation (e.g., jagged lines). Alternately, when text is described by vector data (e.g., by keeping the text elements in separate visual containers), the fidelity is retained for the text even when zooming in, for example.

In one embodiment, when flattening the tree and grouping elements, a second group of compatible blending elements can be started for grouping elements in the tree when a number of elements in a first group meets a desired threshold. For example, "normal" blended elements can be grouped into a visual graphic container until the container is "full," where the number of elements that comprise "full" can be set by a threshold value. As an illustrative example, empirical testing may determine that more than a particular number of elements (e.g., 40) in the visual graphics container can reduce a fidelity, and/or conversion efficiency of the document.

In this way, for example, the number of elements for the document can be reduced by flattening the tree and grouping elements having a compatible (e.g., normal) blending. In the exemplary embodiment 200, reducing of the number of elements can result in one or more groups of blended elements 254, and on or more groups of unblended elements 252.

At 210, non-trivial blended elements are identified. For example, non-trivial blended elements can comprise those graphical elements, text, and/or images that overlap with each other. Further, in this example, the overlapping comprises a non-trivial (e.g., necessary) blending, such that a final visual display of the blended elements incorporates the blending to produce a desired visual effect.

As an illustrative example, two graphical elements may be overlayed in a way where a portion of a top element is partially transparent, such that a portion of an underlying element can be seen through the top element. In this illustrative example, it may be important to incorporate the blending in order to mitigate one of the elements completely cover ring (or being hidden by) the other. As another illustrative example, colors of elements can be blended, and/or portions of one element having a desired color may be designed to show through or over another color of another element. In this illustrative example, a design and/or use of colors between overlapping elements can comprise a non-trivial blending.

Further, the order in which the elements are laid-out, using the vector data for the document, can have an effect on how the blending may be trivial versus non-trivial. For example, two overlapping elements can comprise non-trivial blending, and a third overlapping element, while not blended, can be laid in a desired manner such that its color comprises the top visual effect. In this example, if an order of lay-out for the third element is between the first and second, the third element may need to be included in a bounding area comprising the non-trivial blended elements, so that its color can be seen on top in the visual display.

At 212 in the exemplary embodiment 200, for respective non-trivial blended elements groups, a bounding area is created around the non-trivial blended elements in a group, at 214. In one embodiment, a bounding area can be identified for the one or more non-trivial blended element groups. In this embodiment, an initial bounding area can be identified that comprises the elements associated with the blending.

Figure 4A:
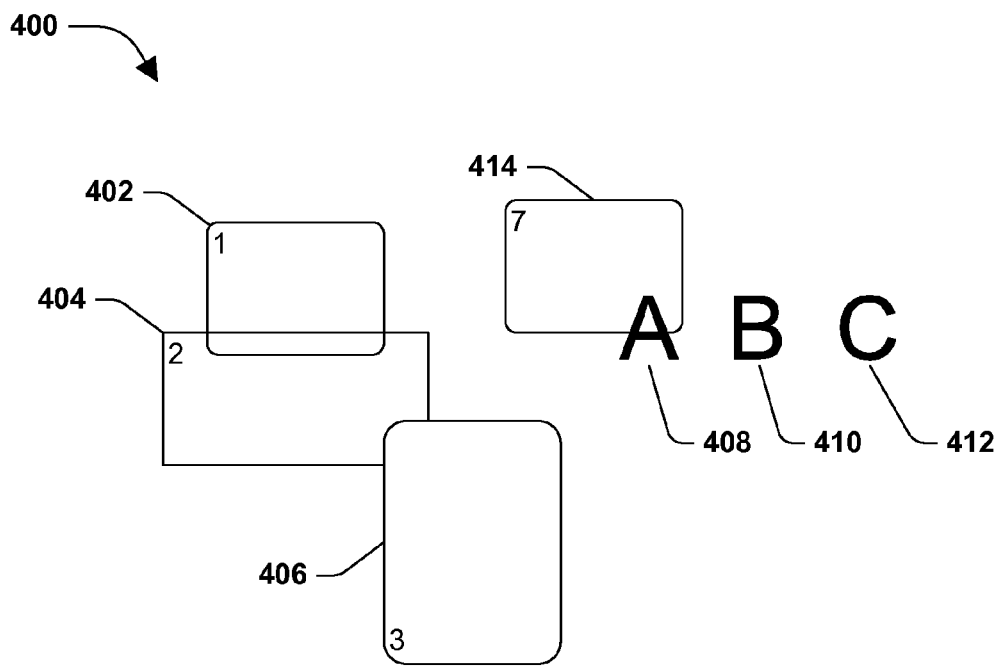
FIGS. 4A and 4B are illustrations of exemplary implementations of one or more techniques described herein.
Figure 4B:
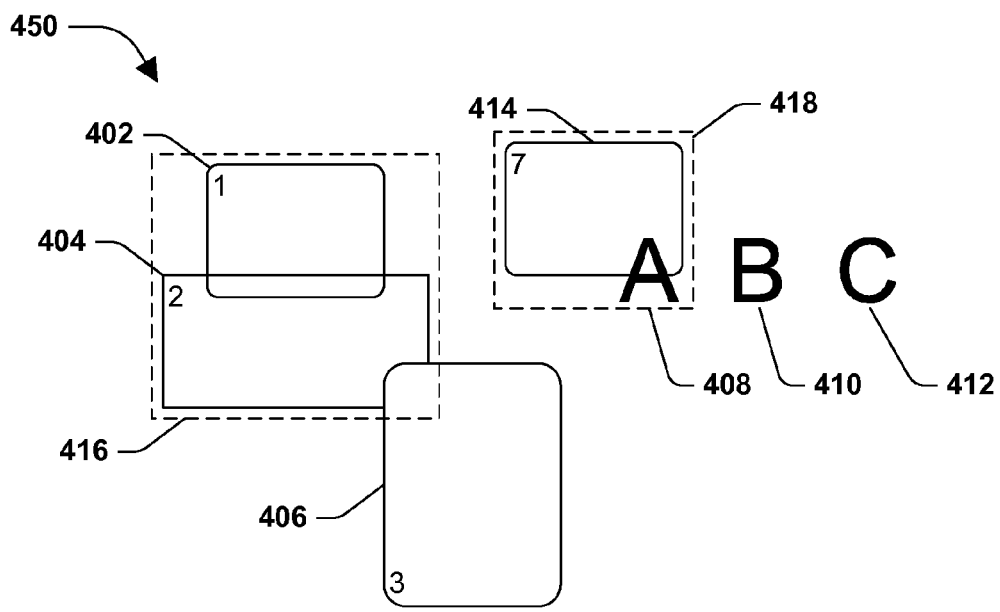

For example, as illustrated in the exemplary embodiment 400 and 450 of FIGS. 4A and 4B respectively, a first element 402 may be laid-out first, and a second element 404 is laid on top of the first element in order. Further, a third element 406 may be laid on top of the second element in the document. In this example 400, the first and second elements 402 and 404 comprise a non-trivial blending, where the first element 402 may be desired to show through the second element 404. In the exemplary embodiment 450, an initial bounding area 416 comprises the first and second elements 402 and 404, as well as a portion of the third element 406.

Returning to FIG. 2, at 216, the initial bounding area can be modified to comprise merely the elements associated with the blending. For example, in FIG. 4B, the elements comprised in the initial bounding area can be examined to determine which elements comprise non-trivial blending, and therefore, will be rasterized, and which ones may not need to be rasterized. In this embodiment, those elements that may not need to be rasterized can be removed from the group of elements in the initial bounding area.

As illustrated in the example embodiment 450 of FIG. 4B, the third element 406 comprises a portion that overlaps the bounding area 416. However, as the third element 406 was laid down after the first and second elements 402 and 404, and the visual lay-out comprises the overlapping portion of the third element 406 to be displayed on top, the initial bounding 416 area can be modified to remove the third element 406, such that the bounding area merely comprises the first and second elements. That is, because the third element 406 is applied after the first and second elements 402 and 404 it will cover a corner of the second element 404 as desired even if it is not included in the initial bounding area 416.

In one embodiment, the modifying the bounding area can comprise reducing the bounding area to mitigate a number of elements in the bounding area. For example, an initial bounding area may comprise all of the first, second and third elements 402, 404 and 406 of the exemplary embodiment 400. In this example, the initial bounding area can be reduced (e.g., as in 404 of 450) to merely incorporate the first and second elements 402 and 404, so that merely those non-trivial blended elements are incorporated in the bounding are.

In another embodiment, the modifying the bounding area can comprise expanding the bounding area to comprise compatible blended elements that overlap one or more elements in the initial bounding area. For example, in the example 400 of FIG. 4A, text elements 408, 410 and 412 may be laid-out in the document prior to a seventh element 414. In this example, the seventh element 414 overlaps the text element "A" is such a way that may obscure the text 408 in a final display. However, the non-trivial blending of the elements 414 and 408 can comprise having the text 408 show over the seventh element 414.

Further, in the exemplary embodiment 450 of FIG. 4B, a bounding area 418 can comprise the non-trivial blending of the two elements 414 and 408. As an illustrative example, if an eighth element (not-shown) comprised an non-trivial blending by overlapping both the first element 402 and the seventh element 414, the initial bounding area 416 can be expanded to comprise the eighth element, seventh element 414 and the text element 408 (as well as the first and second elements 402 and 404).

Returning to FIG. 2, at 218, the bounding area, comprising merely those non-trivial blended elements, is rasterized. For example, rasterizing of the bounding area can comprise creating an image of the bounding area and identifying the raster data for the image, such as the color channel values for respective pixels in the image. In this example, the raster data can comprise a raster image 256 of the non-trivial blended elements in the bounding area, where a blended image of the rasterized elements in the bounding area is generated. At 220, if another group of non-trivial blended elements is identified for the document (e.g., the seventh element 414 and text element 408 of FIG. 4A), the rasterizing process, 212 through 220, can be performed.

In one embodiment, the conversion of the document can comprise converting a browser-based document. For example, a rich vector-based document (e.g., PDF, XPS, etc.) can comprise vector data that may not by supported by most browsers. Therefore, in this example, the rich vector-based document can be converted to a less rich format that can be rendered in the browser. Further, in this embodiment, identifying the bounding area can comprise identifying a blending of graphical elements that are not supported in the less rich format. That is, for example, the browser does not support the vector-data for the blended graphical elements for the document.

In another embodiment identifying the bounding area can comprise identifying a graphical element that is not supported in the less rich format. For example, the browser may not be able to identify the vector data associated with a particular graphical element, even if it is not blended with another element. In this example, the bounding area, and therefore the area of rasterizing, can comprise merely the element that is not supported in the less rich format.

Figure 3:
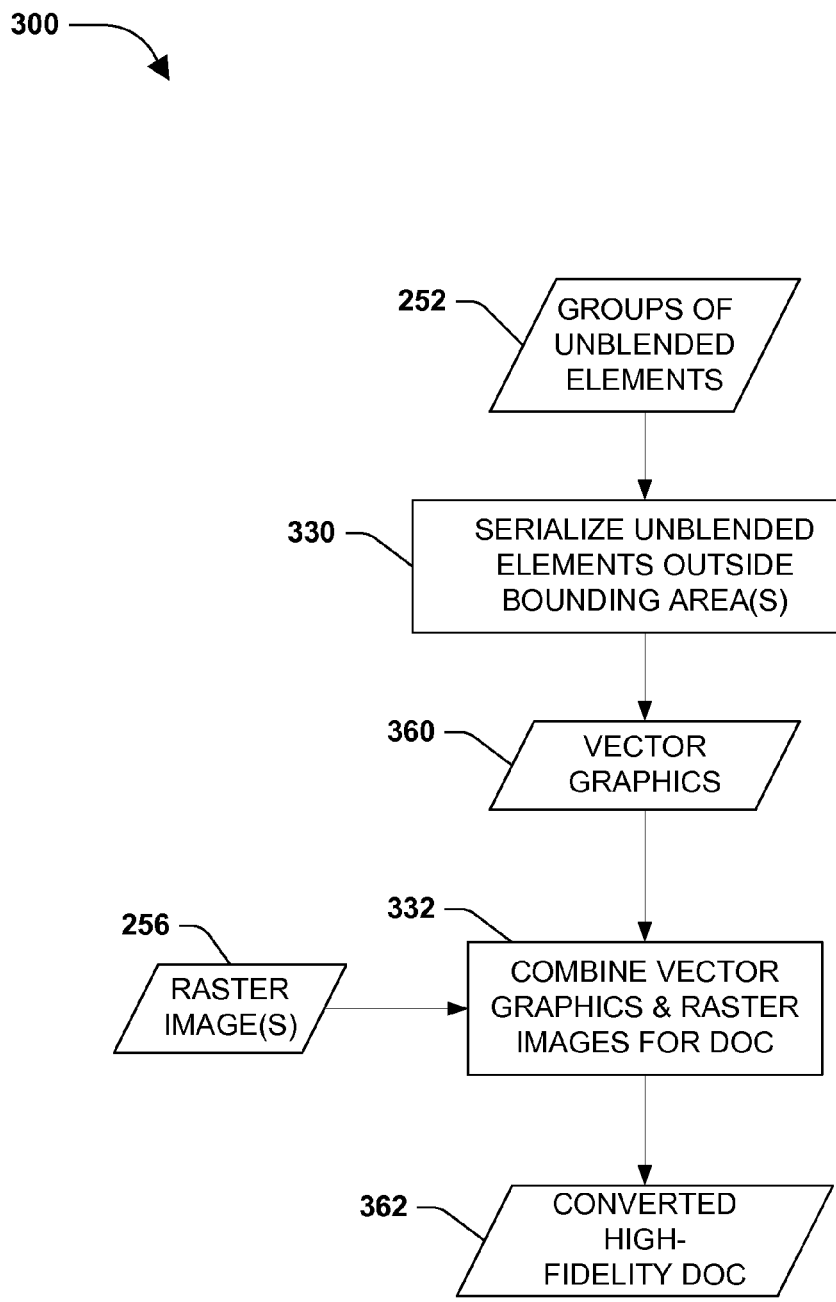
FIG. 3 is a flow diagram illustrating an exemplary embodiment of one or more portions of a method where one or more techniques described herein can be implemented.

FIG. 3 is a flow diagram illustrating an exemplary embodiment 300 of one or more portions of a method where one or more techniques described herein can be implemented. At 330, the group of unblended elements 252, which are outside the bounding area(s), can be serialized. For example, the vector data for elements outside the bounding areas may be laid out in a desired manner for the document. In one embodiment, vector data (e.g., non-rasterized elements) can be serialized in the UIML format, such that the elements are organized according to a desired layout (e.g., in a UIML tree).

At 332, the vector graphics 360 (e.g., serialized UIML format of the non-rasterized elements) can be combined with the raster images 256 (e.g., the images of the non-trivial blended elements in the bounding area(s)) to produce the converted, high-fidelity document 362. In this way, for example, the converted document can comprise a mixture of rasterized images and vector data, where an amount of vector data retained in the converted document is maximized, and an amount of raster images is minimized.

A system may be devised that is configured to convert a rich document to a less rich format, where loss of vector data is mitigated in the converted the document. Converted documents can comprise a mix of raster data and vector data; however, using the systems described herein, a higher fidelity document may be provided by retaining more vector data in the converted document.

Figure 5:
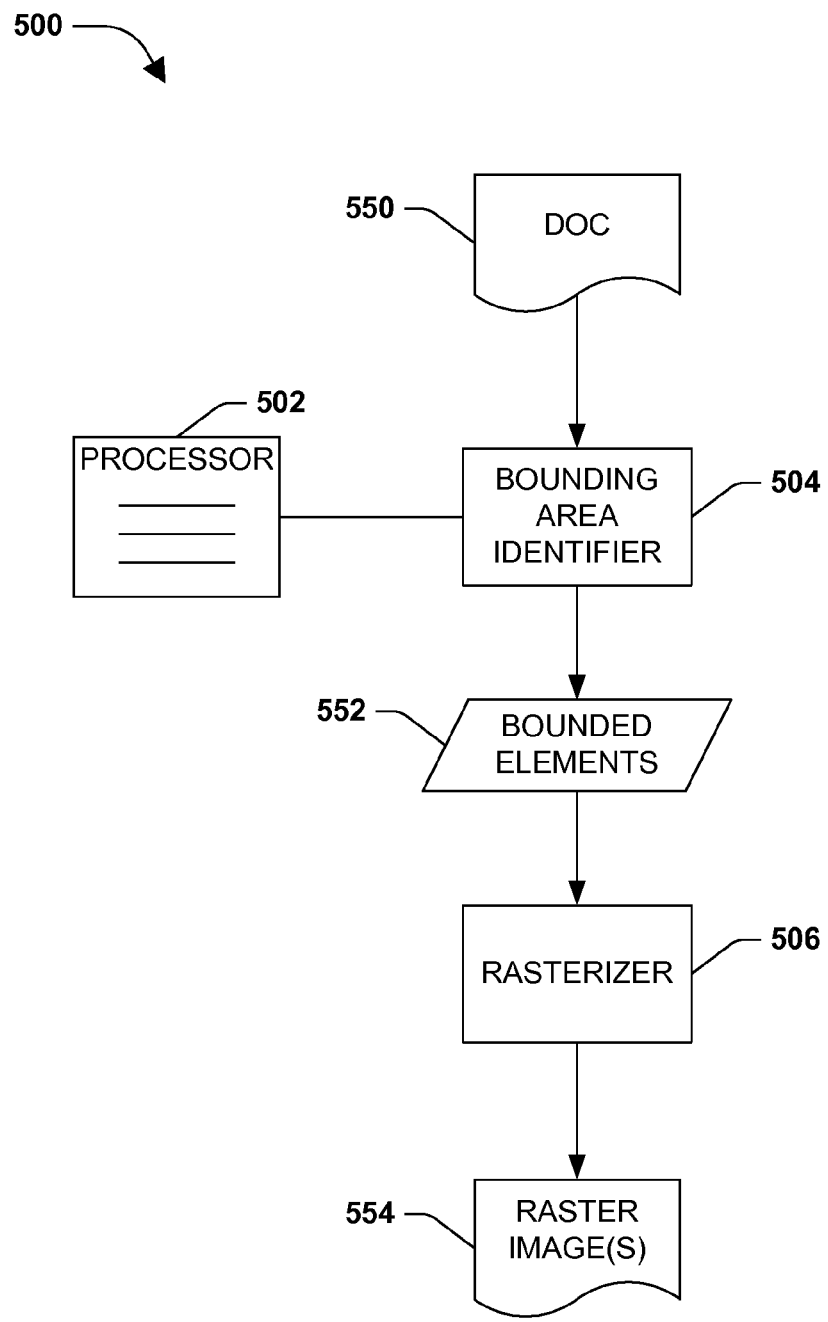
FIG. 5 is a component diagram of an exemplary system for high fidelity conversion of a document to a less rich format.

FIG. 5 is a component diagram of an exemplary system 500 for high fidelity conversion of a document to a less rich format. A processor 502 is configured to process data for the system, and the processor 502 is operably coupled with a bounding area identification component 504. The bounding area identification component 504 identifies a bounding area in the document 550 that comprises blended graphical elements. In this embodiment, the blending of the graphical elements in the bounding area identified by the bounding area identification component 504 is not supported in the less rich format.

A rasterization component 506 is operably coupled with the bounding area identification component 504, and it rasterizes merely the blended graphical elements 552 in the bounding area, in order to generate raster images 554 for one or more portions of the document. In this way, for example, the raster images created by the rasterization component 506 can be combined with those elements in the document that are not rasterized, to produce the converted high-fidelity document.

Figure 6:
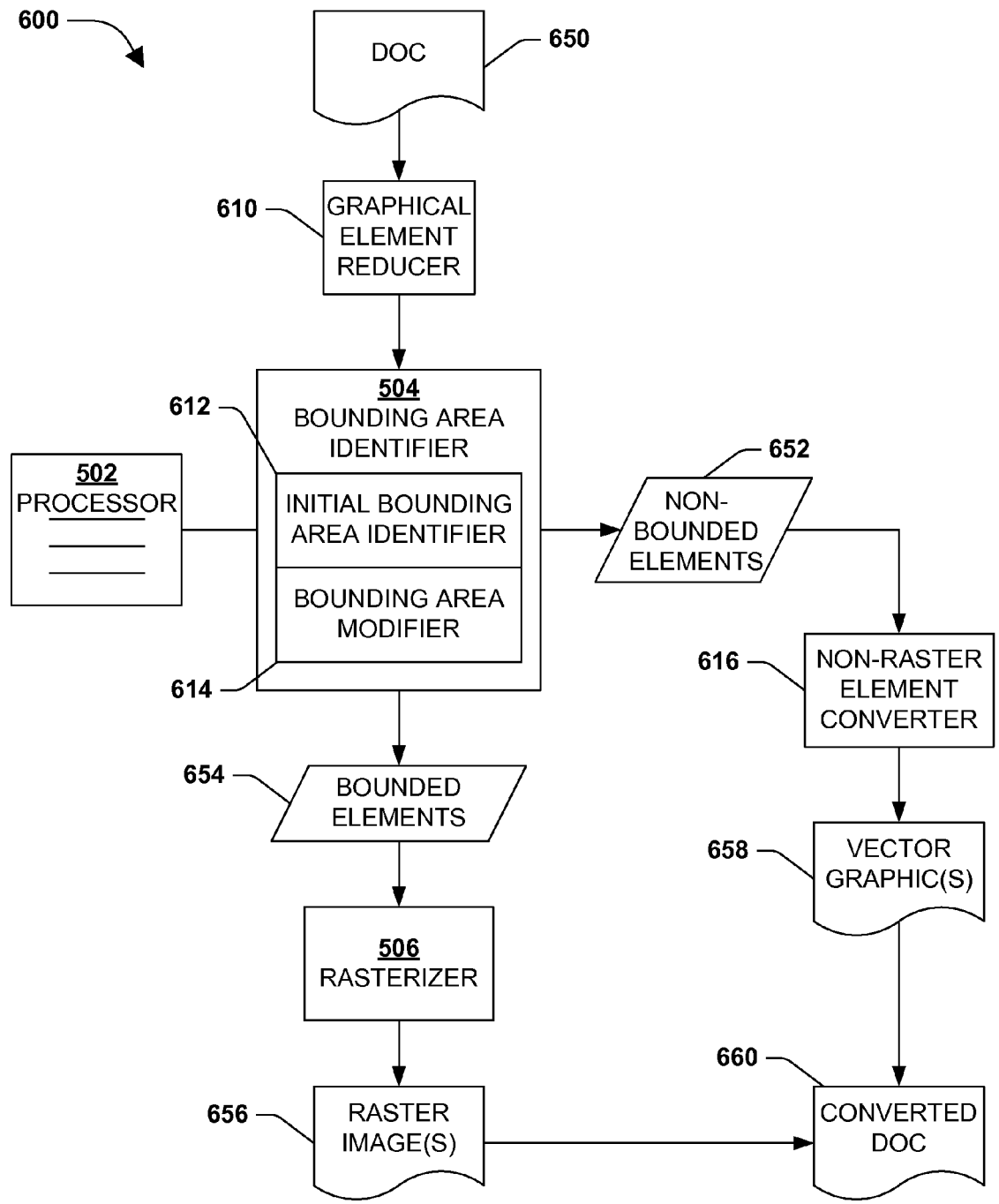
FIG. 6 is a component diagram illustrating an exemplary embodiment where one or more systems described herein may be implemented.

FIG. 6 is a component diagram illustrating an exemplary embodiment 600 where one or more systems described herein may be implemented. A non-rasterized element conversion component 616 can serialize a non-bounded or non-rasterized vector graphical element 652 in the document 650 that is outside the bounding area. In this embodiment, the one or more serialized non-rasterized elements comprise vector data, which can be used to describe vector-based graphics 658 for the converted document 660.

The bounding area identification component 504 can comprise an initial bounding area identification component 612 that identifies an initial bounding area, which comprises at least the blended graphical elements. Further, the bounding area identification component 504 can comprise a bounding area modifier component 614 that modifies the initial bounding area to comprise merely the blended graphical elements 654.

A graphical element reduction component 610 can flatten a vector tree for user interface markup language (UIML) graphical elements of the document 650 so that the vector tree comprises merely leaf UIML graphical elements that are associated with parent container elements of the tree. Further, the graphical element reduction component 610 can group the leaf UIML graphical elements that exhibit compatible blending with each other into a group. In this way, for example, the bounding area identification component 504 can identify the bounding area that comprise merely the non-trivial blended elements, for example, reducing a number of elements analysis iterations.

In one embodiment, the bounding area can comprise a rectangle that merely encompasses the blended graphical elements, such as 416 and 418 of FIG. 4B. In one embodiment, the blended elements can comprise two or more non-trivial blended graphical UIML elements that have a different z-order, where the elements overlap in a layout of the document. That is, for example, the z-order can comprise an order in which the elements in a vector document are laid-out when rendered. Further, elements comprising a different z-order can overlap each other, such that a first element in the z-order may be overlapped by a second element in the z-order.

In one embodiment, the document 650 may comprise vector graphical elements that are not supported in the less-rich format. In this embodiment, the bounding area identification component 504 can be configured to identify the bounding area in the document 650 that comprises one or more vector graphical elements that are not supported in the less-rich format. For example, the graphical elements in the bounding area may not comprise blended elements, but merely vector data-based elements that are not supported in the less rich format. In this embodiment, these elements can be rasterized by the rasterizing component 506, yielding raster images 656 that can be combined with the vector graphics 658 to produce the converted document 660.

Figure 7:
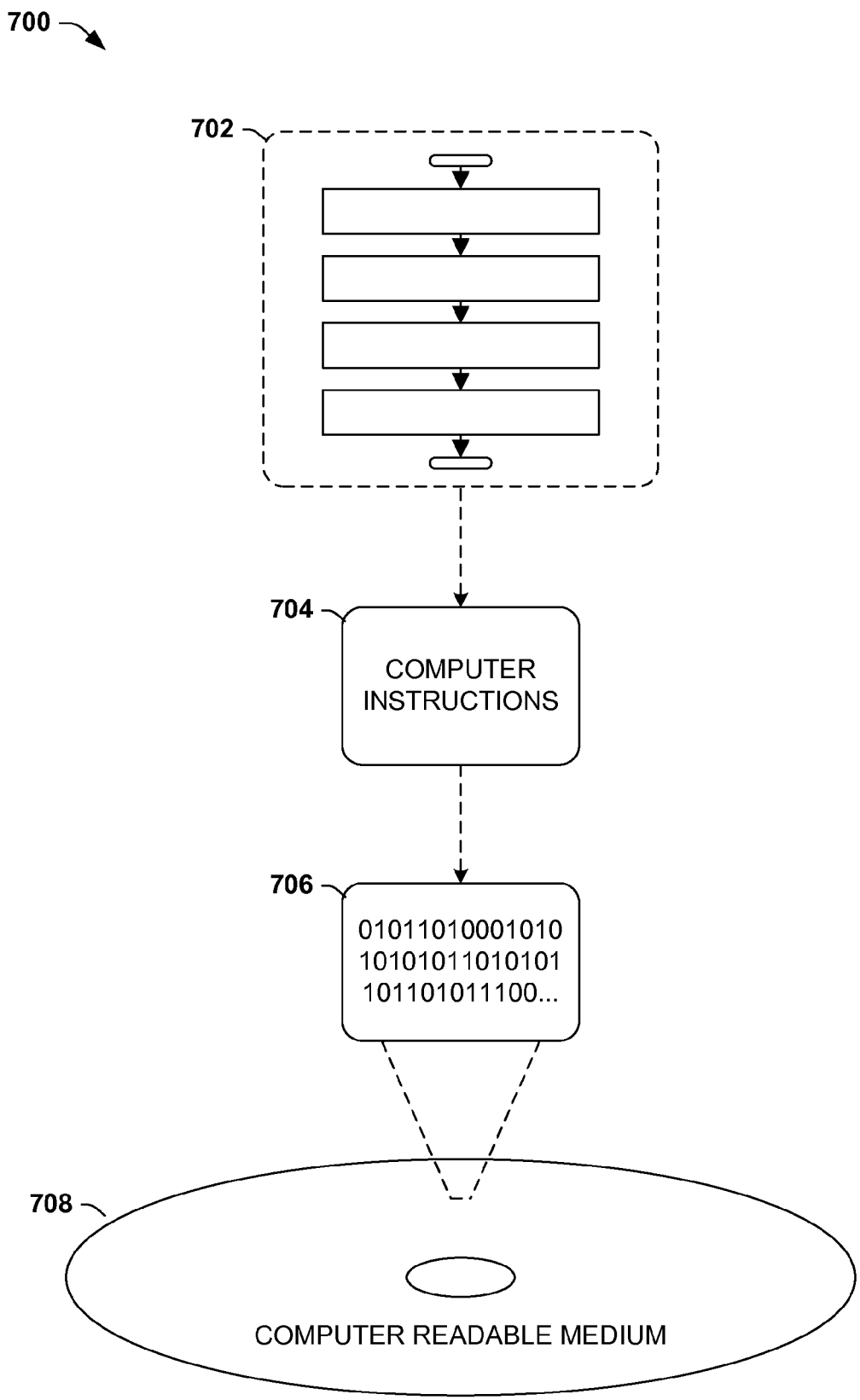
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example.

Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
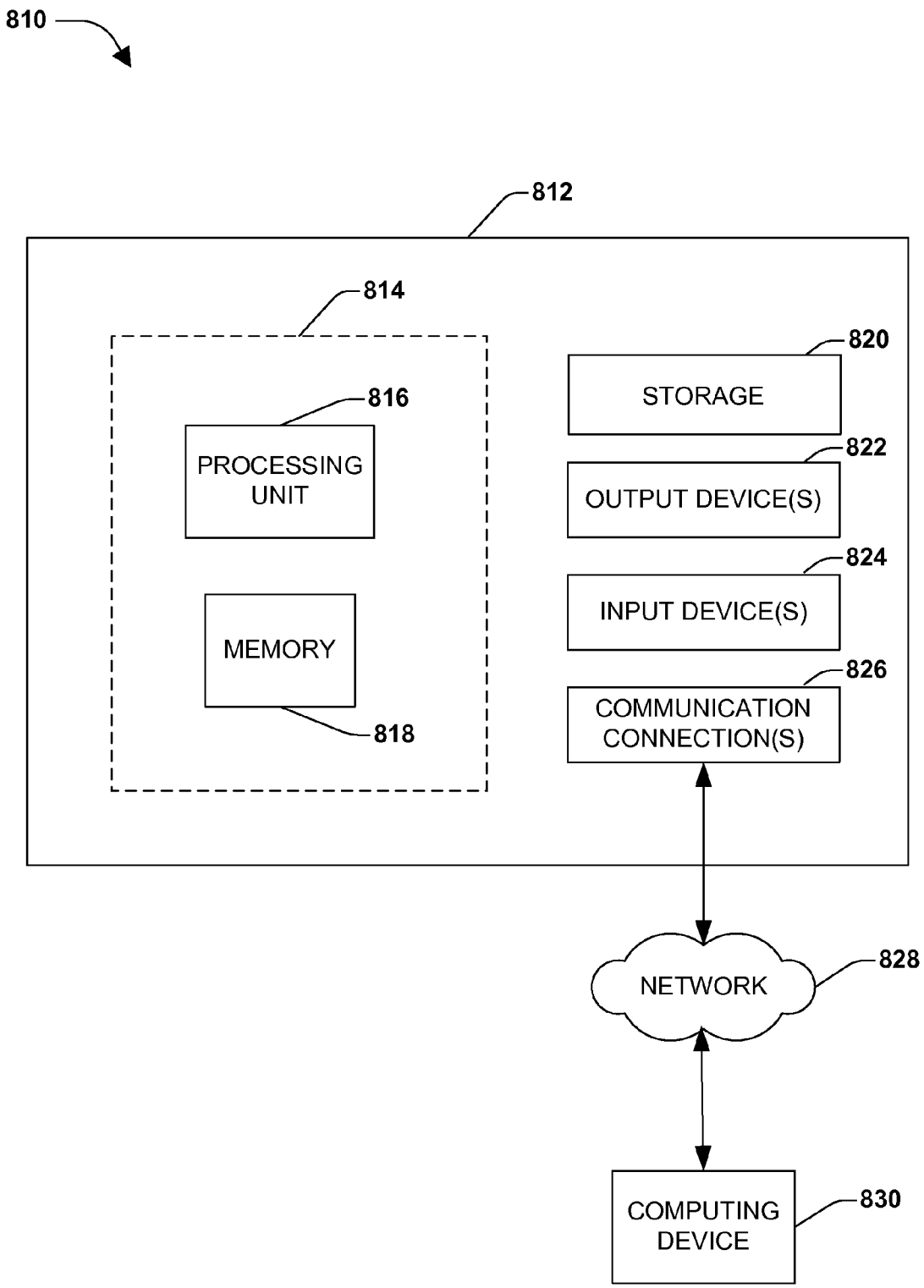
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for document conversion, comprising:
   receiving a document comprising a first element and a second element;
   rasterizing the first element to create a rasterized element responsive to determining that the first element is not supported by at least one of a first format or an application;
   retaining a format of the second element comprised in the document responsive to determining that the second element is supported by at least one of the first format or the application, the second element different than the first element; and
   providing a converted document comprising: the rasterized element; and the second element.

2. The method of claim 1, rasterizing the first element comprising converting a layout of the first element to a raster image format.

3. The method of claim 1, retaining a format of the second element comprising retaining a vector graphic format of the second element.

4. The method of claim 1, comprising flattening a user interface markup language (UIML) vector tree for the document to comprise separate rendering UIML elements for respective clipping canvas children.

5. The method of claim 4, the flattening comprising creating a representation of the vector tree comprising merely leaf graphical elements associated with parent container elements.

6. The method of claim 4, comprising grouping UIML elements that exhibit compatible blending with each other into a group.

7. The method of claim 4, comprising:
   not grouping text-based UIML elements together.

8. The method of claim 1, comprising serializing the second element for the first format.

9. The method of claim 1, comprising generating a blended image using the rasterized element.

10. The method of claim 1, the document comprising a browser-based document.

11. A system for document conversion, comprising:
    one or more processing units; and
    memory comprising instructions that when executed by at least one of the one or more processing units, perform a method comprising:
    receiving a document comprising an element;
    rasterizing the element to create a rasterized element responsive to determining that the element is not supported by at least one of a first format or an application;
    retaining a format of a non-rasterized element comprised in the document responsive to determining that the non-rasterized element is supported by at least one of the first format or the application, the non-rasterized element different than the element; and
    providing a converted document comprising: the rasterized element; and the non-rasterized element.

12. The system of claim 11, the document comprising a browser-based document.

13. The system of claim 12, the method comprising:
    flattening a vector tree for UIML graphical elements of the document to comprise merely leaf UIML graphical elements associated with parent container elements; and
    grouping the leaf UIML graphical elements that exhibit compatible blending with each other into a group.

14. A computer readable device comprising instructions that when executed, perform a method comprising:
> receiving a document comprising a first element and a second element;
> rasterizing the first element to create a rasterized element responsive to determining that the first element is not supported by at least one of a first format or an application;
> retaining a format of the second element comprised in the document responsive to determining that the second element is supported by at least one of the first format or the application, the second element different than the first element; and
> providing a converted document comprising:
> > the rasterized element; and
> > the second element.

15. The computer readable device of claim 14, rasterizing the first element comprising converting a layout of the first element to a raster image format.

16. The computer readable device of claim 14, retaining a format of the second element comprising retaining a vector graphic format of the second element.

17. The computer readable device of claim 14, the method comprising flattening a user interface markup language (UIML) vector tree for the document to comprise separate rendering UIML elements for respective clipping canvas children.

18. The computer readable device of claim 14, the method comprising serializing the second element for the first format.

19. The computer readable device of claim 14, the method comprising generating a blended image using the rasterized element.

20. The computer readable device of claim 14, the document comprising a browser-based document.

* * * * *